United States Patent
Rowland et al.

(10) Patent No.: US 8,180,579 B2
(45) Date of Patent: May 15, 2012

(54) REAL TIME GAMMA-RAY SIGNATURE IDENTIFIER

(75) Inventors: Mark Rowland, Alamo, CA (US); Tom B. Gosnell, Moraga, CA (US); Cheryl Ham, Livermore, CA (US); Dwight Perkins, Livermore, CA (US); James Wong, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 773 days.

(21) Appl. No.: 11/390,728

(22) Filed: Mar. 27, 2006

(65) Prior Publication Data

US 2007/0108379 A1 May 17, 2007

Related U.S. Application Data

(60) Provisional application No. 60/665,619, filed on Mar. 25, 2005.

(51) Int. Cl.
*G01N 31/00* (2006.01)
(52) U.S. Cl. ............................... 702/27; 702/22
(58) Field of Classification Search ............ 702/22
See application file for complete search history.

(56) References Cited

U.S. PATENT DOCUMENTS

| | | | |
|---|---|---|---|
| 5,121,337 A | 6/1992 | Brown | |
| 5,822,219 A * | 10/1998 | Chen et al. | 702/27 |
| 6,115,673 A | 9/2000 | Malin et al. | |
| 6,614,540 B1 * | 9/2003 | Stirton | 356/630 |
| 6,750,964 B2 | 6/2004 | Levenson | |
| 6,839,636 B1 | 1/2005 | Sunshine et al. | |
| 7,902,498 B2 * | 3/2011 | Miller et al. | 250/282 |
| 2002/0051999 A1 * | 5/2002 | Sepetov et al. | 435/7.1 |
| 2004/0119591 A1 | 6/2004 | Peeters | |
| 2004/0215402 A1 * | 10/2004 | Hsiung et al. | 702/22 |
| 2005/0119834 A1 * | 6/2005 | Kita et al. | 702/19 |
| 2005/0239111 A1 * | 10/2005 | Van Rhee et al. | 435/6 |

* cited by examiner

*Primary Examiner* — Jonathan C Teixeira Moffat
(74) *Attorney, Agent, or Firm* — James S. Tak

(57) ABSTRACT

A real time gamma-ray signature/source identification method and system using principal components analysis (PCA) for transforming and substantially reducing one or more comprehensive spectral libraries of nuclear materials types and configurations into a corresponding concise representation/signature(s) representing and indexing each individual predetermined spectrum in principal component (PC) space, wherein an unknown gamma-ray signature may be compared against the representative signature to find a match or at least characterize the unknown signature from among all the entries in the library with a single regression or simple projection into the PC space, so as to substantially reduce processing time and computing resources and enable real-time characterization and/or identification.

11 Claims, 1 Drawing Sheet

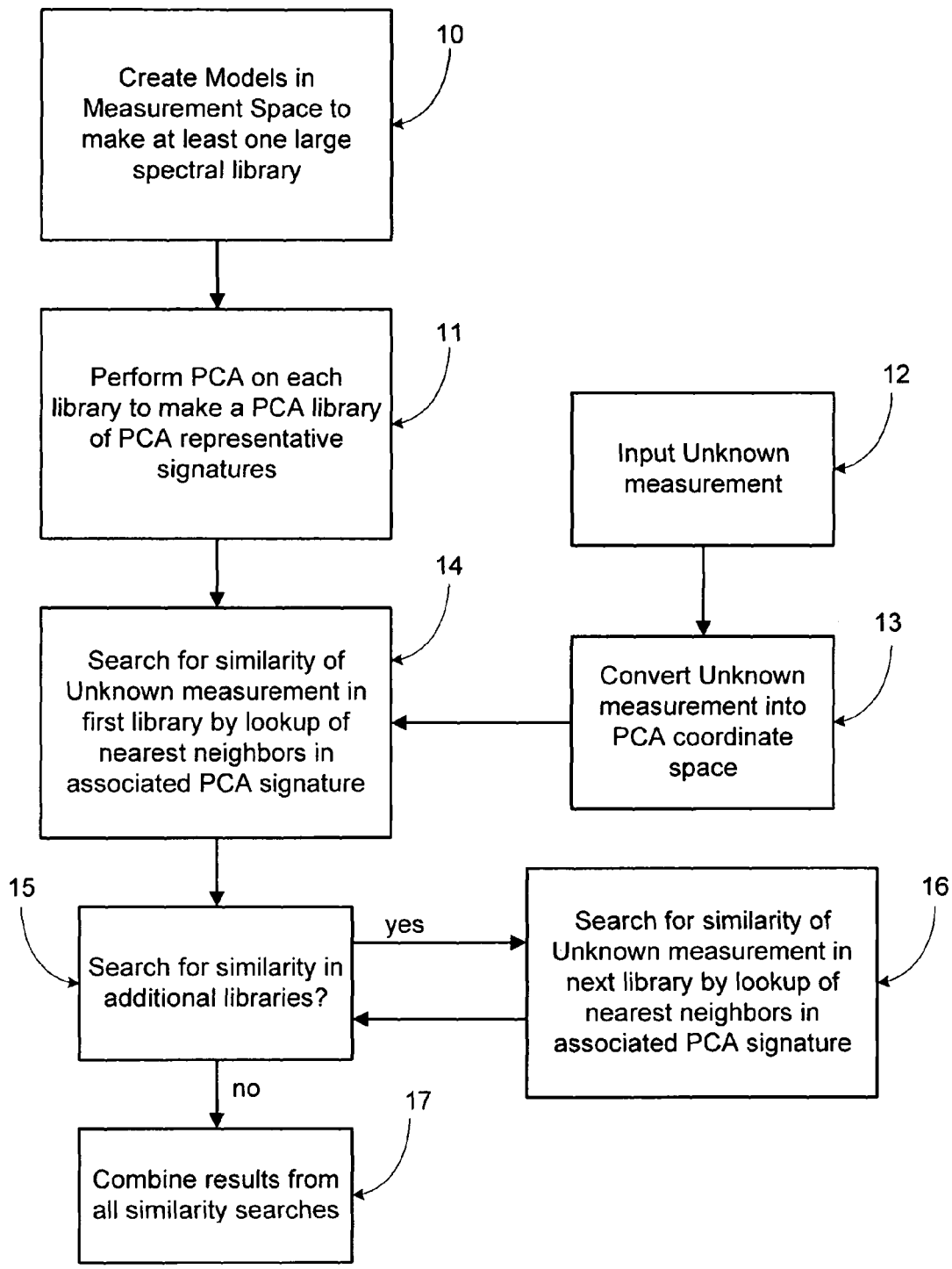

REAL TIME GAMMA-RAY SIGNATURE IDENTIFIER

I. CLAIM OF PRIORITY IN PROVISIONAL APPLICATION

This application claims the benefit of U.S. provisional application No. 60/665,619 filed Mar. 25, 2005, entitled, "Real Time Gamma-Ray Signature Identifier" by Mark S. Rowland et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to gamma-ray signature/source identification methods. More particularly, the invention relates to a real time, non-processor intensive, gamma-ray signature/source identification method and system using a transformed and minimized signature of a large comprehensive spectral library to find a match or at least characterize an unknown signature from among all entries of the library without having to compare/fit the unknown against each entry.

III. BACKGROUND OF THE INVENTION

Identification of nuclides measured by gamma-ray spectrometry is typically performed by focusing on the peaks of an unknown spectrum, and in particular by curve-fitting the peaks to a library of known/predetermined spectral signatures. For example, peak energy assignments are made to nuclides (isotopes), and regression is used to compare predetermined measurements or calculated spectra to an unknown. Using only peaks, however, can be limiting because information useful for identification may also be found elsewhere in the continuum of the full spectrum. For example, Compton scattering of some gamma-rays causes count data to spread beyond the peak locations to the continuum. This Compton scattered part of the gamma-ray spectrum contains information about the radioactive source and the gamma-ray detector. Furthermore, shielded sources frequently contain more counts in the continuum than in the peaks, making identification difficult. For example, peaks tend to vanish when shielding is thick.

Ideally therefore, all available information, including both peaks and continuum, would be used in a comprehensive analysis called "full spectrum analysis" to best determine the identity of an unknown source without requiring prior knowledge of any shielding. Automating full spectrum analysis to run unattended on a computer, however, has been a challenge because of both a limited ability to model or measure all the relevant physics for all possible sources and shields, and the processor intensive nature of comparing an unknown spectrum against all entries in a given spectral library.

A typical example of full spectrum analysis and gamma-ray signature identification in the prior art involves first creating a library of possible signatures, such as by measuring known signatures, calculating known signatures in real time, or pre-calculating known signatures for a catalog. Multiple regression is then performed to search for the most similar match of an unknown to a known in the library, where the test for similarity may be a test for maximum likelihood, chi-square or simple differences. Regression test comparison involves solving a linear series of equations, usually reduced to array algebra, typically where a matrix is inverted. Matrix inversion can become unreliable as library elements become similar. And since computer time is proportional to the number of channels (energy increments) in the gamma-ray spectrum times the number of library elements, providing a large library can significantly increase processing time/computing resources. For example, 8000 library elements times 200 channels is 1.6 million operations. Furthermore, fine tuning the library at regression time is another option known in the art, where the calculation codes generate new variations as the regression is running. This approach, however, can take even longer since computational time is proportional to the number of channels in the spectrum times the number of library elements times the number of seconds to calculate a spectral variation.

Since the possible list of predetermined known entries for which variations must be calculated is typically in the hundreds, and not the typical range of up to about thirty predetermined known entries in the library that exist in commercial algorithms, this pushes a typical multiple regression or regression/model approach to take up to hours of CPU time, especially if geometry variational calculations are involved. Because of these limitations, traditional regression approaches typically have limited library sizes in order to reduce the total number of regressions performed and keep CPU time reasonable. The disadvantage of small libraries, however, is that they induce classically systematic errors leading to incorrect library lookup. As a consequence, the results of such an identification scheme using a limited library may not provide a complete or accurate characterization or identification of the unknown spectrum.

What is needed therefore is a real-time (i.e. on the order of a second or less) method and system for identifying gamma-ray signatures that uses little computer processor time and resources, analyzes the full gamma-ray spectrum, and can be adjusted to address numerous identification objectives, such as for example nuclide ID, source strength, age, shielding thickness, or nuclear material form. In particular, what is needed is a method and system that effectively transforms and reduces the voluminous spectral data contained in a comprehensive spectral library to a small, manageable representation/signature(s) of the library, and directly compares an unknown spectrum against the representation(s) to find a match or at least determine a characterization of the unknown by similarity to all spectral entries of the library. Moreover, this is performed without the computational burden of having to perform fine-grain multiple regression, i.e. fitting the unknown against each entry of the source library. Additionally, and with respect to building the library, such a method and system would also be configured to obtain factual information/details about the signatures used as library entries, without having to particularly measure for the information. While such information is typically obtained by measurement, it would be advantageous to instead use suitably accurate simulations of the known/predetermined signatures to obtain this information and thereby avoid the expense (in terms of processor time/computing resources) associated with actually measuring for all possible variations on the signatures when building a comprehensive library.

IV. SUMMARY OF THE INVENTION

One aspect of the present invention includes a real time gamma-ray signature/source identification method using principal components analysis (PCA) for transforming and substantially reducing one or more comprehensive spectral libraries of nuclear materials types and configurations into at least one corresponding concise representation/signatures(s) representing and indexing each individual predetermined spectrum in the principal component (PC) space, wherein an unknown gamma-ray signature may be compared against the one or more representative signature(s) to find a match or at least characterize the unknown signature from among all the entries in the library with a single regression or simple projection into the PC space per signature, so as to substantially reduce processing time and computing resources and enable real-time characterization and/or identification.

Another aspect of the present invention includes a real-time method of identifying radioactive materials by their gamma-ray signatures comprising: providing at least one library of predetermined spectra for various nuclear material types; performing principal component analysis on the library to produce a corresponding transformed basis set representing the library and indexing each spectrum of the library in principal component space; projecting an unknown spectrum onto the principal component space; and determining the identity of the unknown spectrum by its proximity to clusters of the basis set in the principal component space.

Another aspect of the present invention includes a real-time computerized gamma-ray signature identification system comprising: at least one library of predetermined spectra for various nuclear material types and configurations; computer processor means for performing principal component analysis on the library to transform the library into a corresponding basis set representing the library and indexing each spectrum of the library in principal component space; computer processor means for determining the identity of the unknown spectrum by projecting an unknown spectrum onto the principal component space and determining its proximity to clusters of the basis set in the principal component space.

Another aspect of the present invention includes a real-time computerized gamma-ray signature identification system comprising: at least one library of predetermined spectra for various nuclear material types and configurations; a principal component analysis module adapted to perform principal component analysis on the library so as to transform the library into a basis set representing the library and indexing each spectrum of the library in principal component space; an input module for receiving an unknown spectrum to be identified; and computer processor means for determining the identity of the unknown spectrum by projecting the unknown spectrum onto the principal component space and determining its proximity to clusters of the basis set in the principal component space.

Another aspect of the present invention includes an article of manufacture comprising: a computer usable medium having computer readable program code means embodied therein for identifying in real-time radioactive materials by their gamma-ray signatures, the computer readable program code means comprising: at least one computer readable library of predetermined spectra for various nuclear material types; computer readable program code means for performing principal component analysis on the library to produce a transformed basis set representing the library and indexing each spectrum of the library in principal component space; computer readable program code means for determining the identity of the unknown spectrum by projecting an unknown spectrum onto the principal component space and determining its proximity to clusters of the basis set in the principal component space.

Generally, the method of the present invention proceeds by modeling or measuring with all the fidelity necessary to capture all the information theoretically present in a detector signature and collecting in a comprehensive, large literal library. The maximum information content mostly relates to the resolution properties of the gamma-ray spectrometer. With respect to library creation, the method need not rely on calculations to include all the necessary detail (i.e. it is not bound by empirical limitations), but may rather enable the extraction of the available information from the measuring system. Thus resolution-limited information content drives and determines the sensibility limits on how many things would be calculated to add to and enhance the library.

PCA is then performed to condense the large library to one or more compact representative signature(s) of attributes (i.e. principal components), each typically comprising 5 to 20 orthogonal descriptors. Fast comparison is possible because one lookup gives a match. The large library is further enhanced to characterize all variations. In particular, PCA labeling, unitization, subsets, and/or energy bin-sets are used to derive, find, or otherwise characterize different kinds of information.

An unknown measurement/spectrum is then converted into PCA coordinate space. This involves a single, simple operation to get PC coordinates per signature which may be accomplished in several ways. For example, conversion can be performed most easily with a single regression of the PC's chosen (typically 5 to 20) with the unknown spectrum. Amplitudes of the PC's that optimally match the data are the coordinates.

Then, proximity determination is performed to lookup the nearest neighbors in the library, i.e. closest to the coordinates of the unknown. This is a single sort which is fast on a computer and where computer time is proportional to n times m where n is the length of the list and m is the number of selected PC's. For example, with 8000 library elements times and the number of selected PC's being <20 the computer time is about 160000 operations, or about 10 times faster than a regression approach. Reporting information is stored along with the coordinates, and may be varied in complexity to suit different user needs, and is presented with the nearest neighbor found. Answer quality has the merit of being thorough, because the library may be big, and because the PC's are selected to intentionally represent all the information present in the data that a spectrometer provides.

The following is a general outline of the method steps of a preferred embodiment of the present invention:

(1) Create models in measurement space
    model alteration options
        add background model, or
        don't add background
(2) Make PCA library
    transform library to coordinate space and catalog
        unitize the magnitude, or
        leave the magnitude scale absolute
(3) Search for similarity in the first library
    subtract background, or not, depending on type of library created
    transform unknown to the above library coordinate space
    lookup nearest neighbors
    conditional test to decide if and which library might next be searched.
(4) Search for similarity in the second library
    subtract background, or not, depending on type of library created
    transform unknown to the above library coordinate space
    lookup nearest neighbors
    conditional test to decide if and which library might next be searched.
(5) Search more libraries search if desired
(6) Combine results from steps (3) through (5).

V. BRIEF DESCRIPTION OF THE DRAWINGS

The accompanying drawings, which are incorporated into and form a part of the disclosure, are as follows.

FIG. 1 is a schematic flow diagram illustrating the method steps of a preferred embodiment of the present invention.

VI. DETAILED DESCRIPTION

The present invention is generally directed to a gamma-ray signature identification method and system by full spectrum analysis, using principal component analysis (PCA) to substantially compress or reduce one or more analytically comprehensive libraries of modeled, tabulated or otherwise predetermined spectra into a corresponding small basis set(s). The basis set is a transformed and minimized representation of all spectra in the library, and is used instead of the library entries for fitting and identifying an unknown spectrum. Moreover, the use of the basis set enables the identification of the unknown spectrum with a single regression/simple projection, and avoids the multiple regressions required in the prior art when comparing against each spectrum in a library. One advantage of this arrangement is that it substantially reduces the processing time and computing resources necessary to perform the identification against an existing library. It also substantially reduces the processing time necessary to additionally calculate in real-time (i.e. while the next increment of data is collected or within the time it took to make the measurement) the shielding variations. Furthermore, it enables the creation and use of an expanded, comprehensive spectral library including substantially all nuclear material types, including intrinsic and extrinsic variations, such as shielding configurations, which was otherwise not possible due to the processor intensive nature of fitting an unknown spectrum against all spectra in a library.

It is appreciated that PCA is generally an exploratory multivariate statistical technique known in the art that allows the identification of key variables (or combinations of variables) in a multi-dimensional data set that best explain the differences between observations. PCA transforms a multivariate data set in such a manner that only a few of the new, uncorrelated varieties (PC's) are needed to retain nearly all of the variation present in the original data set. Given m observations on n variables, PCA serves to reduce the dimensionality of the data matrix by finding r new variables ($r \leq n$). These r PC's account together for as much of the variance in the original n variables as possible while remaining mutually uncorrelated and orthogonal. In this manner the first few PC's may be used as a multi-component signature that is capable of describing the feature space of expected gamma-radiation signatures with considerable accuracy. Thus PCA serves to reduce dimensionality while filtering noise in the process, making the data more accessible for visualization and analysis.

Implementation of PCA for gamma-ray source identification in the present invention includes the following steps: (1) preparation of one or more libraries of gamma-ray spectra that samples the gamma-ray source space of interest, (2) PCA is performed on the spectral library(s) and (3) unknown spectrum is projected into the PC space and the known source types/configurations which are closest distancewise to the unknown are identified as most consistent with the unknown, wherein distance is similarity or Curies or inches of shielding or nuclide identity. FIG. 1 shows an exemplary flow scheme of the present invention.

In FIG. 1, reference character 10 shows a first step where models are first created in measurement space to produce at least one large spectral library. Preparation of the comprehensive source library is accomplished by first modeling/measuring and tabulating Photo-peak, Compton, escape and secondary peak signatures to identify source types, e.g. simple sources such as 57 Co, parent-daughter mixtures such as 99Mo/99m Tc, varieties of heavy element sources such as weapons-grade or reactor-grade plutonium, etc. Intrinsic and extrinsic variations on the sources are also identified and included in the library. Intrinsic variations may include, for example, time elapsed since chemical separation. And extrinsic variations may include, for example, packaging or other intervening material types/configurations (e.g. shielding configurations) that will alter the gamma-ray spectra of the source types. (See below for greater discussion of creating variations in the library) The many various combinations of these variations are used to create comprehensive source libraries comprising many thousands of gamma-ray spectra.

While spectral information is typically obtained by measurement, it may alternatively be obtained using suitably accurate simulations of the known/predetermined signatures and thereby avoid the expense (in terms of processor time/computing resources) associated with actually measuring for all possible variations on the signatures when building a comprehensive library. To this end, an algorithm may be utilized that, with enough fidelity, can calculate all signature variations to avoid the difficulty of measuring everything. The spectra used as entries for the library may be obtained, for example using an automation script that describes each of the source variations desired and runs the spectrum generator. For example, a widely available radiation transport code, such as MCNP (copyright UC-LANL), may be used to compute the large library of spectra, including detector response features. The script would command a combined radiation transport/instrument response computer calculation that computes library elements. An alternative to calculating libraries is to measure the library elements. This would involve obtaining all radioactive sources, with varying strengths, many thicknesses of shielding material and types, and then every detector to measure all possible combinations of source, shielding, and detector.

It is appreciated that when collecting the spectral data for preparing the library, the spectra may be formatted, unitized, or otherwise pre-processed to produce different model groups (i.e. multiple libraries) and facilitate subsequent processing and comparison to unknown spectra. For example, in the case of unitizing the original data, all spectra models in the library may be scaled or normalized to, say 100 counts, to remove variations in source strength. Formulating a library in this manner forces the algorithmic approach of the present invention to focus on identifying the nuclide, as opposed to the source strength. This makes possible the running of both a unitized and a non-unitized library, after which combining the results gives more insight into the nature of an unknown source. Thus, another aspect to formulating the libraries is that the approach of the present invention includes the ability to commingle measurements and simulations. It is anticipated that an end user will want to include unique measurements, outliers, etc. in the PCA library of computed spectra. The algorithmic approach of the present invention to spectral ID (using PCA) specifies that the library may be in measurement space and therefore accepts the addition of a library element derived through means other than calculation.

It is also notable that the spectral models may be grouped (overlapping or not) to produce one or more libraries comprising spectral families, categories, and/or sub-categories which share common characteristics. For example, a main library may be a generic list containing the spectra of all models, while another library may be specific to special nuclear materials (SNM), and thereby provide greater insight into the nature of the unknown spectrum. Inherent in the lookup of the closest match to an unknown, is the labeling of the library element. It may be simply called, for example, Nuclide-X, or "Bad-Nuclide", where the choice is therefore based on the end-user needs for information. Different levels of information are easily defined with the library elements for the purpose of imparting the correct information.

PCA is next performed on the spectral library(s), as indicated at reference character 11 in FIG. 2, to decompose the tabulated results of the original spectral data set into a corresponding small basis set which is a projection of the original spectral data into principal component (PC) space. Thus the basis set is a transformed and minimized representation of the library that can index and describe any tabulated result with a linear combination of basis vectors (i.e. principal components). In the process of making the PC's, one selects a subset of the PC's, such that the variance present in the library is addressed by the subset of PC's. This may be provided by a user who inputs the number of PC's to be used. This may result in the library variations being addressed to, for example, the $98^{th}$ percentile. Selecting fewer PC's will run faster, but describe less of the variance. For low resolution detectors, the information content in the library presents degeneracies. These degeneracies are situations where there is no apparent difference between two measurements or library elements. Since this is the reality with all low resolution detectors, there will be a maximum number of PC's necessary to identify the information present in an unknown gamma-ray spectrum. As spectrometer resolution decreases (i.e. NaI to plastic), fewer PC's are necessary to describe the information that is present in an unknown spectrum. Non-unitized large libraries may be well represented by as few as four PC's. It is appreciated that PCA may be applied to each library where multiple categorical libraries are provided, to generate corresponding basis sets. In this manner, the identification inquiry of an unknown spectrum may be tailored to particular libraries in order to answer user-specific questions of the unknown spectrum and achieve greater insight into the nature, character, and identity thereof. In effect, the provision of multiple libraries serves to reduce even more dimensions of variance and complexity accomplished by PCA.

It can be appreciated that one beneficial attribute to the PCA approach is that proximity (as in a non-exact library lookup match) relates to the feature errors in the model. For example, given two sources in the library, one with shielding and the other without, if the unknown signature has half shielding its coordinates are half way between the two library elements. Its nearest neighbors are identified and the distances to each are provided, allowing an interpolation of a thickness for the shield. Since much of the prior art operates with 30 elements and interpolate with regression (limited), whereas the present invention puts all identified unknowns in the library, the present invention is expected to have at least 5 times more depth of spectrum characterization. While doing more is possible, there is a point of diminishing return driven by the limited information content in low resolution detectors. Thus the algorithm of the present invention serves to calculate all signature variations using suitably accurate simulations to avoid the difficulty of actually measuring every possible variation.

One exemplary method of implementing PCA involves using a PCA code/software which first locates a rebinning file to a file of energy bin limits and rebins each spectrum in the gamma-ray spectrum library into a smaller, more manageable number of bins, such as 100-300. Following rebinning, the PCA is performed. For this step, a user may provide input as to the number of principal components (PC's) to be used for PCA analysis. The results of the analysis are saved to a data file and include the PC's and the PC scores (i.e. the location of the each individual spectrum for the library in the PC space, and label attributes that describe the salient nature of each library element.

Identification is performed by projecting the unknown into PC space. Implementation of the identification step may be accomplished, for example, using a computer code is run that allows the user to input an unknown spectrum. The input step is shown at reference character 12 of FIG. 1. The specified energy bin set (if used) is used with a particular PCA library, and the desired number of PC's to be used for analysis. As shown at 13, the unknown is then rebinned (if needed), normalized (if needed), and rotated into the PC space, i.e. the unknown spectrum is projected into the space described by the basis set that was derived from all the library models. The rotation is the regression to get PC amplitudes.

Similarity to library models is next measured (at 14 in FIG. 1) by the proximity to nearby library models in the PC space described by the basis set, with the Mahalanobis distance used as the proximity measure. The proximity to and the character of the nearby cluster of models represent a statement of identity which is translated into specific characteristics that describe the unknown. In particular, the Mahalanobis distances are sorted by increasing value with the lowest values being most consistent, and therefore the source associated with that PC score being most consistent, with the item producing the Mahalanobis distance. The Mahalanobis distance is used for interpolating attribute dimensions in library sets assembled for the purpose of interpolating, thereby increasing the range of library coverage.

As previously mentioned, various identification objectives may be met by tailoring the contents in a library of models, by running different libraries sequentially, and/or building a logic sequence for forming conclusions based on intermediate analysis results. This is shown at reference characters 15 and 16 in FIG. 1. An example of running sequential libraries is to run the unitized set first to get the ID, then run a non-unitized set with only that nuclide but with source strength variations. Logical conclusions may be constructed, for example, by noting that SNM may not be close to the unknown in the unitized library lookup, but by secondarily running the unknown through the SNM only library, one may construct a conditional probability such as "while most likely the unknown is nuclide-X, if SNM were present in hidden form, it would most likely be SNM-Y. At step 17, the results from all similarity searches are then combined. It is appreciated that while a computer program is discussed for implementing the present invention, the implementation of the functions described herein may be accomplished equally by, for example, hardware, firmware, IC, etc. specifically designed with such functionalities.

While particular operational sequences, materials, temperatures, parameters, and/or particular embodiments have been described and or illustrated, such are not intended to be limiting. Modifications and changes may become apparent to those skilled in the art, and it is intended that the invention be limited only by the scope of the appended claims.

We claim:

1. A real-time method of identifying radioactive materials by their gamma-ray signatures on a computerized gamma-ray signature identification system, comprising:

receiving an unknown gamma-ray spectrum as input into the computerized gamma-ray signature identification system;

providing in the computerized gamma-ray signature identification system at least two libraries of predetermined spectra for various nuclear material types with each library having spectral entries which share a common pre-defined parameter that is different from and independent of other libraries;

in a computer processor of the computerized gamma-ray signature identification system, performing principal component analysis on each of said at least two libraries to produce corresponding transformed basis sets representing the libraries and indexing each spectrum of the libraries in principal component space;

in the computer processor, projecting an unknown spectrum onto the respective principal component space of said at least two libraries; and in the computer processor, determining a first identity of the unknown spectrum based on the unknown spectrum's proximity to clusters of a basis set in the principal component space of a first one of said at least two libraries;

in the computer processor, determining a second identity of the unknown spectrum based on the unknown spectrum's proximity to clusters of a basis set in the principal component space of a second one of said at least two libraries; and presenting the determined identity of the unknown spectrum to a user as the first identity based on the assumption that the unknown spectrum meets the criteria of a first pre-defined parameter and as the second identity based on the assumption that the unknown spectrum meets the criteria of a second pre-defined parameter.

2. The method of claim 1, wherein the step of providing the at least two libraries of predetermined spectra includes calculating signature variations to avoid the difficulty of measuring for signature variations.

3. The method of claim 1, wherein the at least two libraries include predetermined spectra for various nuclear material types and associated intrinsic and extrinsic variations.

4. The method of claim 3, wherein the extrinsic variations include shielding configurations.

5. The method of claim 1, wherein the at least two libraries are each a comprehensive library having entries representing substantially more than thirty spectral models.

6. The method of claim 1, wherein the spectral entries of a first one of said libraries share a common characteristic of being unitized.

7. The method of claim 1, wherein performing principle component analysis includes receiving input for a desired number of principal components to be used for principle component analysis.

8. The method of claim 1, wherein the respective basis sets index individual spectra of the libraries in the principle component space by means of principal component scores.

9. The method of claim 1, wherein the step of determining the identity of the unknown spectrum by combining results of the unknown spectrum's proximity to clusters of each of the basis sets in the respective principal component spaces of said at least two libraries includes the determination of Mahalanobis distances to nearby cluster of models.

10. A real-time computerized gamma-ray signature identification system comprising:

at least two libraries of predetermined spectra for various nuclear material types and configurations with each library having spectral entries which share a common characteristic pre-defined parameter different from and independent of other libraries;

computer processor means for performing principal component analysis on each of said libraries to transform the libraries into a corresponding basis sets representing the libraries and indexing each spectrum of the libraries in principal component space;

computer processor means for determining the identity of the unknown spectrum as a first identity based on the assumption that the unknown spectrum meets the criteria of a first pre-defined parameter and as a second identity based on the assumption that the unknown spectrum meets the criteria of a second pre-defined parameter by projecting an unknown spectrum onto the respective principal component space of said at least two libraries.

11. A real-time computerized gamma-ray signature identification system comprising:

at least two libraries of predetermined spectra for various nuclear material types and configurations with each library having spectral entries which share a common pre-defined parameter different from and independent of other libraries;

a principal component analysis module adapted to perform principal component analysis on each of said libraries so as to transform the libraries into a corresponding basis sets representing the libraries and indexing each spectrum of the libraries in principal component space;

an input module for receiving an unknown spectrum to be identified;

and computer processor means for determining the identity of the unknown spectrum as a first identity based on the assumption that the unknown spectrum meets the criteria of a first pre-defined parameter and as a second identity based on the assumption that the unknown spectrum meets the criteria of a second pre-defined parameter by projecting the unknown spectrum onto the respective principal component space of said at least two libraries.

* * * * *